US010067986B1

(12) United States Patent
Thapliyal et al.

(10) Patent No.: US 10,067,986 B1
(45) Date of Patent: Sep. 4, 2018

(54) DISCOVERING ENTITY INFORMATION

(71) Applicant: GetGo, Inc., Boston, MA (US)

(72) Inventors: Ashish V. Thapliyal, Santa Barbara, CA (US); Kimaya Vishal Mittal, Goleta, CA (US)

(73) Assignee: GetGo, Inc., Boston, MA (US)

( * ) Notice: Subject to any disclaimer, the term of this patent is extended or adjusted under 35 U.S.C. 154(b) by 474 days.

(21) Appl. No.: 14/701,319

(22) Filed: Apr. 30, 2015

(51) Int. Cl.
*G06F 17/30* (2006.01)
*G06Q 50/00* (2012.01)

(52) U.S. Cl.
CPC .... *G06F 17/3053* (2013.01); *G06F 17/30867* (2013.01); *G06F 17/30876* (2013.01); *G06Q 50/01* (2013.01)

(58) Field of Classification Search
CPC .................................................. G06F 17/3053
USPC ....................................................... 707/723
See application file for complete search history.

(56) References Cited

U.S. PATENT DOCUMENTS

| | | | | |
|---|---|---|---|---|
| 6,029,195 A * | 2/2000 | Herz | ................. | G06F 17/30867 348/E7.056 |
| 7,792,837 B1 * | 9/2010 | Zhao | ................. | G06F 17/30616 707/709 |
| 2002/0188586 A1 * | 12/2002 | Veale | ................. | G06F 17/30734 707/999.001 |
| 2005/0149507 A1 * | 7/2005 | Nye | ................. | G06F 17/30864 707/3 |
| 2008/0005090 A1 * | 1/2008 | Khan | ................. | G06F 17/30864 707/999.004 |
| 2008/0040316 A1 * | 2/2008 | Lawrence | ......... | G06F 17/30572 707/999.003 |
| 2008/0133540 A1 * | 6/2008 | Hubbard | ............... | H04L 63/101 707/10 |
| 2009/0119268 A1 * | 5/2009 | Bandaru | ............. | G06F 17/2745 705/7.12 |
| 2009/0144609 A1 * | 6/2009 | Liang | .................... | G06F 17/278 715/230 |
| 2009/0164431 A1 * | 6/2009 | Zivkovic | ............... | G06F 17/278 707/999.003 |
| 2009/0192996 A1 * | 7/2009 | Guo | ....................... | G06Q 30/02 707/3 |
| 2009/0234853 A1 * | 9/2009 | Gupta | ............... | G06F 17/30864 707/6 |
| 2010/0185691 A1 * | 7/2010 | Irmak | ............... | G06F 17/30707 707/803 |
| 2013/0318098 A1 * | 11/2013 | Chan | ..................... | G06Q 50/01 707/748 |

\* cited by examiner

*Primary Examiner* — Pierre M Vital
*Assistant Examiner* — Andrew N Ho
(74) *Attorney, Agent, or Firm* — BainwoodHuang

(57) ABSTRACT

A technique for acquiring information about entities includes receiving starting data including an entity name and/or email address, generating a URL (Uniform Resource Locator) from the starting data, and downloading content from a website at the generated URL. Downloaded content from the website is analyzed to generate a set of entity-specific information and a confidence score. The confidence score specifies a likelihood that the entity-specific information pertains to the same entity that was described in the starting data. Using the improved technique, persons are able to obtain information about entities, even small, private entities about which information online is sparse, along with a measure of quality of the information obtained.

19 Claims, 8 Drawing Sheets

DISCOVERING ENTITY INFORMATION

BACKGROUND

Organizations and individuals often seek to obtain information about entities, such as businesses, government organizations, charitable organizations, and schools, for example. For instance, it may be desirable to obtain information about entities to help inform decisions about whether to approach such entities as potential suppliers from which to obtain goods and/or services, or as potential consumers to which to market goods and/or services. Sometimes, people wish to find out about entities because they are searching for employment or because they are looking to hire employees for their own organizations. Other times, people wish to find out about entities to perform investigative work.

Conventional approaches to obtaining information about entities include compiling articles, advertisements, and postings from newspapers, magazines, and websites. A common medium for acquiring information about entities is the Internet, and common tools used for obtaining such information are search engines.

SUMMARY

Unfortunately, information about many entities is often difficult to acquire. For example, although numerous resources on the Internet provide data about large entities, such as publicly traded corporations and government agencies, information is generally sparse about smaller entities, such as privately held companies and other private organizations. Sometimes, a person seeking information about an entity may start with nothing more than the name of the entity or an email address issued by the entity, such as the email address of an employee of the entity. Obtaining actionable entity information from such little starting material can, for most people, prove difficult or impossible.

To address the desire of persons and organizations to learn about entities, an improved technique for acquiring information includes receiving starting data including an entity name and/or email address, generating a URL (Uniform Resource Locator) from the starting data, and downloading content from a website at the generated URL. Downloaded content from the website is analyzed to generate a set of entity-specific information and a confidence score. The confidence score specifies a likelihood that the entity-specific information pertains to the same entity that was described in the starting data. Using the improved technique, persons are able to obtain information about entities, even small, private entities about which information online is sparse, along with a measure of quality of the information obtained.

In various examples, the improved technique acquires additional entity-specific information and/or validates already-acquired information, by accessing public databases and/or social networking websites. In a particular example, entity-specific information about a private entity, for which public information is sparse or unavailable online, is obtained by identifying events that link the private entity with one or more public entities about which public information is readily available. The technique can then apply selected information about the public entity to the private entity, thus obtaining information about the private entity by its association with the public entity.

Certain embodiments are directed to a method of providing information about entities. The method includes receiving, by an entity discovery server over a network, a message including starting data specifying at least one of (i) an email address issued by an entity and (ii) a name of the entity. In response to receiving the message, the method further includes machine-generating a URL (Uniform Resource Locator) from the starting data, the URL identifying a website available on the network. The method further includes submitting, by the entity discovery server, an HTTP (Hypertext Transfer Protocol) instruction directed to the URL to download content from the website. A machine-based analysis is performed on the content downloaded from the website to generate a set of entity-specific information and a confidence score, the confidence score specifying a likelihood that the entity-specific information pertains to the same entity that was described in the starting data. The method further includes transmitting a response over the network to a client machine, the response including the entity-specific information and the confidence score.

Other embodiments are directed to a computerized server apparatus constructed and arranged to perform a method of providing information about entities to users, such as the method described above. Still other embodiments are directed to a computer program product. The computer program product includes a set of non-transitory, computer-readable media having instructions which, when executed by a controller of a computerized server apparatus, cause the controller to perform a method of providing information about entities. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for acquiring information about entities includes receiving starting data providing an entity name and/or email address, generating a URL (Uniform Resource Locator) from the starting data, and downloading content from a website at the generated URL. Downloaded content from the website is analyzed to generate a set of entity-specific information and a confidence score.

Figure 1:
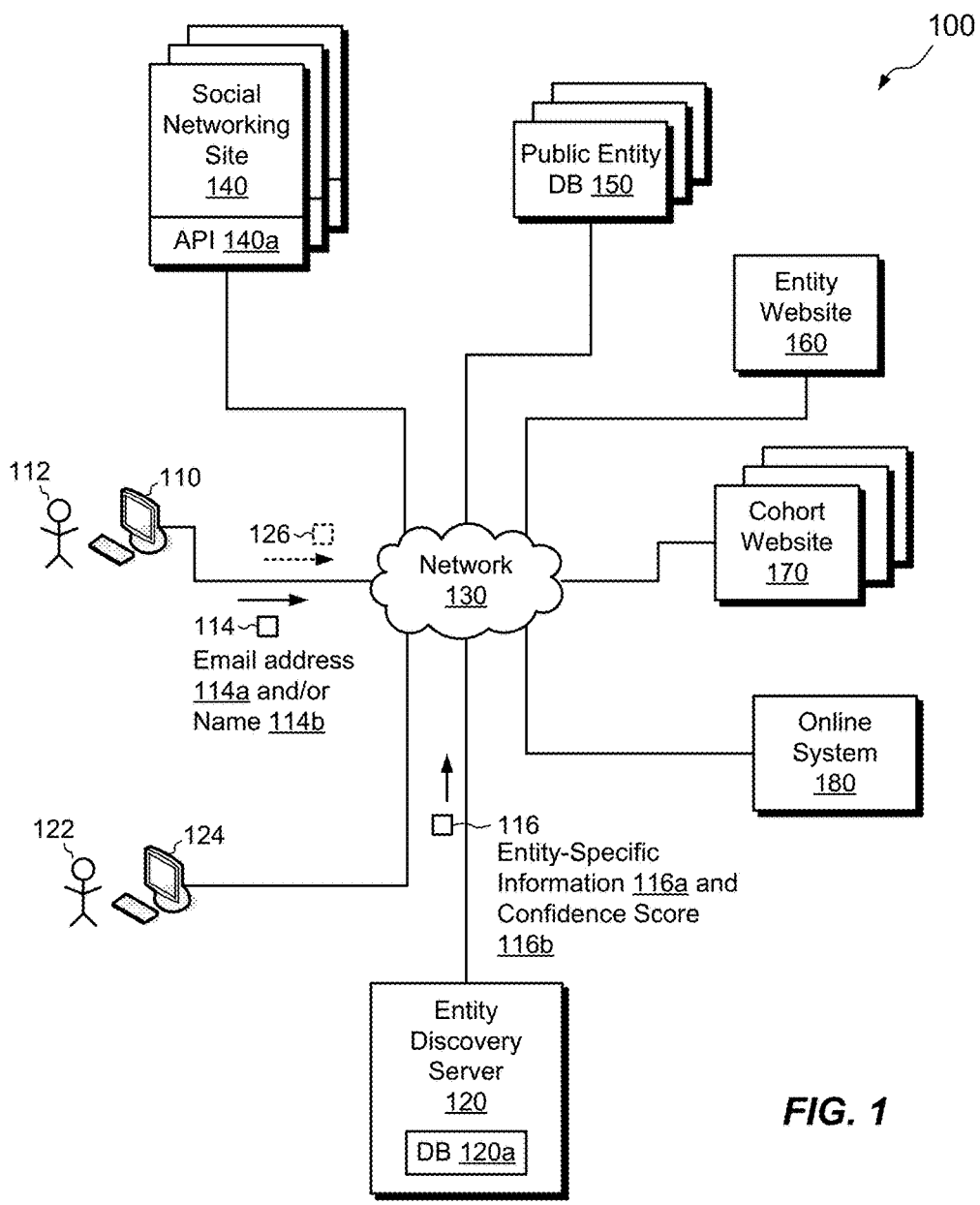
FIG. 1 is a block diagram of an example environment in which the improved techniques hereof can be practiced.

FIG. 1 shows an example environment 100 in which embodiments of the improved technique hereof can be practiced. Here, a first client machine 110, e.g., operated by a first user 112, and a second client machine 122, e.g., operated by a second user 124, are each coupled to a network 130. The network 130 provides the first client machine 110 and the second client machine 122 with access to an entity discovery server 120. As will be described, the entity discovery server 120 obtains and/or generates entity-specific information in response to messages from client machines and provides machine-generated confidence scores.

Numerous other servers and/or systems may be coupled to the network 130 and may participate in the techniques disclosed herein, including, for example, a social networking website 140, a public entity database 150, an entity website 160, a cohort website 170, and an online system 180. In an example, each of the servers and systems 140, 150, 160, 170, and 180 is run on a respective server machine or on multiple server machines.

The client machines 110 and 122 may take any suitable form, such as that of a desktop computer, laptop computer, smartphone, tablet, PDA (personal data assistant), television, set-top box, and so forth. Different client machines may take different forms. The network 130 may be implemented using any type of network capable of conveying data, such as a WAN (Wide Area Network), a LAN (Local Area Network), a cable television network, a satellite network, a cell phone network, an over-the-air broadcast network, or any type of network or combination of networks. In an example, the network 130 includes the Internet.

The social networking website 140 may, for example, be Facebook, Twitter, Linked-In, Instagram, or any other social networking website. Any number and/or kind of social networking websites may be employed. In an example, the social networking website 140 has an API (Application Programmer Interface) 140a. Clients may access data stored on the social networking website 140 via the API, e.g., by logging in, running queries, and receiving responses. In an example, the API is implemented using a REST (Representational State Transfer) protocol, although any protocol may be used, as governed by the particular implementation of the social networking website 140.

The public entity database 150 may, for example, be the Edgar database of the SEC (U.S. Securities and Exchange Commission), Yahoo! Finance, a state corporation database, a local business registry, an online phone listing (e.g., yellow pages), an online patent and/or trademark database, or some other database providing information about entities. Any number and/or kind of public entity databases may be employed. In an example, the public entity database 150 includes information about publicly traded corporations. For instance, the public entity database 150 may also (or alternatively) provide information about privately held corporations or other organizations.

The entity website 160 is the website of a particular entity, i.e., the entity about which the entity discovery server 120 is directed to acquire information. For example, if the entity about which information is to be acquired is "ACME Telecom and Communication Company," then the entity website 160 would be an official website of ACME Telecom and Communication Company. Although a single entity website 160 is shown, it should be understood that the particular identity of the entity website 160 depends upon the entity about which information is sought.

The cohort website 170, any number of which may be employed, is a website of another entity having some relationship with the entity about which information is sought. For example, the cohort website 170 may be the website of a competitor, a partner, a supplier, a customer, or an organization having some other connection with the entity.

The online system 180 is a system available online for performing services on behalf of users. Examples may include shopping sites, online forums, social networking sites, cloud computing or storage sites, and conferencing sites. In a particular, non-limiting example, the online system 180 is a server for facilitating online conferences, such as web conferences, webinars, web-based training, or web-based teaching, for example. In some examples, the online system 180 is operated by the same party that operates the entity discovery server 120, although this is not required. As will be described, the online system 180 may act to receive data entered by users and to relay the data to the entity discovery server 120.

In example operation, the user 112 operates the first client machine 110 to send a message 114. The entity discovery server 120 receives the message 114. The message 114 includes an email address 114a issued by an entity and/or a name 114b of the entity.

If the message 114 includes an email address, then, in response to receiving the message 114, the entity discovery server 120 machine-generates a URL (Uniform Resource Locator), based on the message 114. The URL identifies a website of the entity on the network 130, i.e., the entity website 160. The entity discovery server 120 then constructs an HTTP (Hypertext Transfer Protocol) instruction, such as an HTTP request or call, and directs the HTTP instruction to the machine-generated URL. Executable code running on the entity discovery server 120 downloads content from the entity website 160 at the generated URL and proceeds to perform a machine-based analysis on the downloaded content to generate a set of entity-specific information 116a. The entity discovery server 120 further computes a confidence score 116b. The confidence score 116b specifies a likelihood that the entity-specific information 116a pertains to the same entity that was described in the message 114, i.e., the one identified by the name and/or email address. The entity discovery server 120 may then send a response 116 back over the network 130. The response 116 includes the entity-specific information 116a and the confidence score 116b.

If the message includes an entity name but no email address, the entity discovery server 120 may instead perform a web search for the entity name. For example, the entity discovery server 120 may construct a search query for the entity name and submit the search query to Google Custom Search API, or to some other search API or search engine. The entity discovery server 120 may receive search results and visit a link-to page in the search results. The entity discovery server 120 may then extract a candidate entity name from the linked-to page. As will be described in more detail below, extracting the name can be performed in a number of ways, such as by identifying a copyright notice or title on the linked-to page. The entity discovery server 120 may then compare the extracted name with names of known entities, e.g., on a known-entities list. If the extracted name matches a known name, then the entity discovery server 120 may generate a result indicating that the linked-to page is part of a website of the entity. If not, the entity discovery server 120 may visit another link returned in response to the search query and try again.

Users may operate the entity discovery server 120 in a variety of contexts. According to one example, the entity discovery server 120 provides a service to the user 112 by generating the entity-specific information 116a and the confidence score 116b in response to the message 114. Here, the message 114 is part of a request for information about the entity. For instance, the user 112, who is in possession of the entity name and/or a work email address of an employee of the entity, submits the message 114 to the entity discovery server 120 to request information about the entity. In response to the request, the entity discovery server 120 performs data processing and analysis and returns the response 116 to the client machine 110.

According to another example, the user 112 submits information 126 to the online system 180, rather than to the entity discovery server 120. In this example, the user 112 may be an employee or a consultant of the entity, and the information 126 includes the user's own company name and/or work email address. The user may send the information 126 to the online system 180, e.g., as part of a registration or logon process. In a particular example, the user 112 provides the information 126 address to register for an electronic conference (e.g., for a web conference, webcast, web training event, etc.) or to join a conference. In response to receiving the information, the online system 180 sends a message 114 including the information 126 to the entity discovery server 120. The entity discovery server 120 receives the message 114 and performs data processing and analysis to generate the entity-specific information 116a and the confidence score 116b, as described above. The entity discovery server 120 may store the generated information in a database 120a, e.g., along with information about other entities, and may provide the information to the second client machine 124. For example, the client machine 124 may query the entity discovery server 120 for information about an entity. In response to the query, the entity discovery server 120 performs a lookup in the database 120a and returns the requested information to the client machine 124.

The user 122 of the second client machine 124 may employ the entity-specific information 116a for any number of purposes. For example, the user 122 may work on behalf of an operator of the online system 180 and may apply entity-specific information 116a to learn more about the entity so as to target offers for particular products and/or services to the entity. In another example, the user 122 may perform investigative work and may wish to learn about the entity using the online system 180, e.g., for business, educational, or law enforcement purposes.

In an example, the entity discovery server 120 provides the confidence score 116b as a number or percentage, e.g., such that a confidence score of 90% reflects a computation that there is a 90% likelihood that the entity-specific information is accurate. Alternatively, the entity discovery server 120 may provide the confidence score 116b as a category, such as "Low," "Medium," or "High." These examples are merely illustrative, however, as the entity discovery server 120 may compute the confidence score 116b in any suitable form. In some examples, the entity-specific information 116a may include multiple elements of information, and a different confidence score may be provided for each of the elements, or for a subset of them. Any such additional conference score or scores may be included in the response 116.

In an example, the entity discovery server 120 performs one or more verification tasks to confirm that the entity-specific information 116a is accurate, and applies results of the verification tasks in generating or updating the confidence score 116b. For example, executable code running on the entity discovery server 120 may analyze downloaded content and check information at one location in the downloaded content against information at another location in the downloaded content. In some examples, the executable code may query the social networking website 140 via the API 140a, or follow a link to the social networking website 140 in the downloaded content, and cross-check information found in the downloaded content against information about the entity available on the social networking website 140. When the entity discovery server 120 performs cross-checking, the entity discovery server 120 may recompute the confidence score 116b based on whether the different sources of information agree or disagree.

The entity discovery server 120 may also obtain additional information about the entity from the social networking website 140, the public entity database 150, and/or the cohort website 170. The entity discovery server 120 may store such additional information in the database 120a in connection with the entity.

Figure 2:
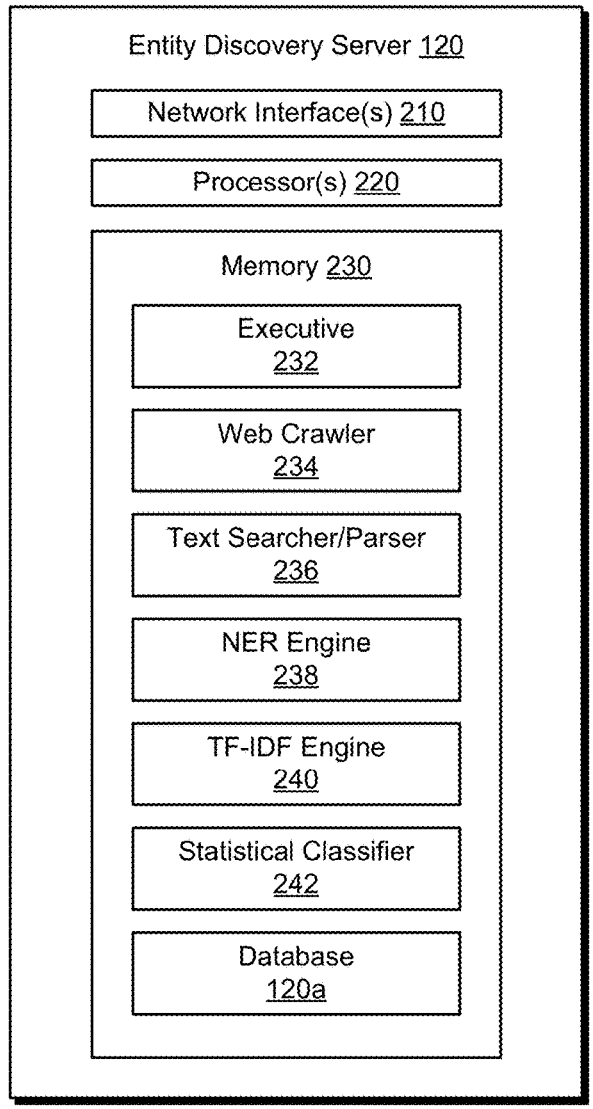
FIG. 2 is a block diagram of an example entity discovery server, as shown in FIG. 1.

FIG. 2 shows an example implementation of the entity discovery server 120. Here, the entity discovery server 120 is seen to include a network interface 210, such as an Ethernet, WiFi, cellular, or other adapter, for connecting to the network 130, a set of processors 220 (e.g., one or more processing chips and/or assemblies), and memory 230. The memory 230 includes both volatile memory (e.g., RAM) and non-volatile memory, such as one or more disk drives, solid state drives, and the like. The set of processors 220 and the memory 230 together form a controller, which is constructed and arranged to carry out various methods and functions as described herein. Also, the memory 230 includes a variety of software constructs realized in the form of executable instructions. When the executable instructions are run by the set of processors 220, the set of processors 220 are caused to carry out the operations specified by the software constructs. Although certain software constructs are specifically shown and described, it is understood that the memory 230 typically includes many other software constructs, which are not shown, such as an operating system and various applications, processes, daemons, and so forth.

As shown, the memory 230 stores executable instructions and data for realizing multiple software constructs, which in some examples include the following:

Executive 232. A construct for controlling entity discovery operations, including receiving messages 114, sending responses 116, directing acquisition and generation of entity-specific information and confidence scores, and acting as an interface to other software constructs and systems.

Web crawler 234. A construct for visiting websites on the network 130, following links, and building indices of terms associated with respective web pages.

Text searcher/parser 236. A construct for searching downloaded content for particular text strings and for processing those text strings.

NER (named-entity recognition) engine 238. A construct for receiving a text string as input and returning any named entities appearing within the text string as output.

TF-IDF (term frequency-inverse document frequency) engine 240. A construct that identifies terms in a text passage that are likely to be representative of the subject matter described in the text passage, and presents the identified terms as keywords.

Statistical classifier 242. A statistical classifier that, when suitably trained on a corpus of text, performs a statistical analysis to classify a set of keywords in one of multiple classifications. In an example, the statistical classifier is provided as a naïve Bayes classifier.

Database 120a. A database, as shown in FIG. 1 that relates particular entities with respective entity-specific information and confidence scores.

Although FIG. 2 shows the above-described software constructs provided within the memory 230 of the entity discovery server 120, it should be understood that any of these software constructs may alternatively be provided elsewhere, such as on other servers available on the network 130, with the entity discovery server 120 providing an interface to those servers for accessing the respective services. Various operations of these software constructs will become apparent from the descriptions of example processes that follow.

Figure 3:
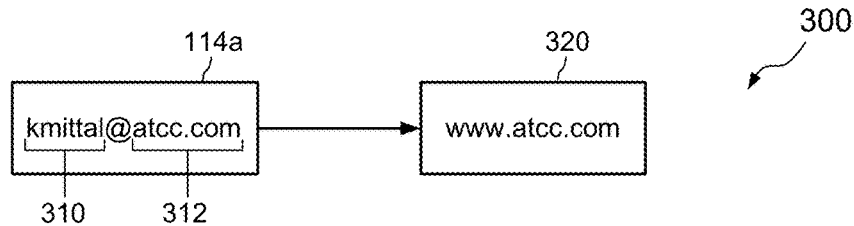
FIG. 3 is a block diagram showing an example process for generating a URL from an email address.

FIG. 3 shows an example process 300 for generating a URL 320 from an email address 114a. The process 300 may be carried out, for example, by the executive 232 working in connection with the text searcher/parser 236, and may operate in response to the entity discovery server 120 receiving a message 114, e.g., from the client machine 110. Here, the email address 114a is seen to include a name 310 (e.g., "kmittal") followed by an ampersand "@" followed by a domain name 312 (e.g., "atcc.com"). The domain name 312 includes a root, e.g., "atcc," and an extension, e.g., ".com." In an example, to generate the URL 320, the executive 232 passes the email address 114a to the text searcher/parser 236 with instructions to extract the domain name 312. In response, the searcher/parser 236 searches for the ampersand and returns as the domain name 312 all text in the email address 114a to the right of the ampersand. To complete the process 300, the entity discovery server 120 appends the text "www." to the left of the domain name 312 to provide the URL 320. It should be understood that the name "ACME Telecom and Communication Company" and the domain name "atcc.com" are fictitious, and that any relation to any real company name and/or domain name is purely coincidental.

With the URL 320 thus generated from the email address 114a, the executive 232 may pass the URL 320 to the web crawler 234 with instructions to obtain contents from a website identified by the URL 320. In an example, the web crawler 234 generates an HTTP instruction, such as an HTTP request or call, which specifies the URL 320, and submits the HTTP instruction over the network 130. In response to submitting the HTTP instruction, the web crawler 234 downloads contents from the website. The contents may include text, graphics, and/or other web content from any webpages on the website. In an example, the web crawler 234 visits an initial webpage at the URL 320 and follows any hyperlinks presented on that page to other webpages on the website. For each page visited, the web crawler 234 may download page content.

Figure 4:
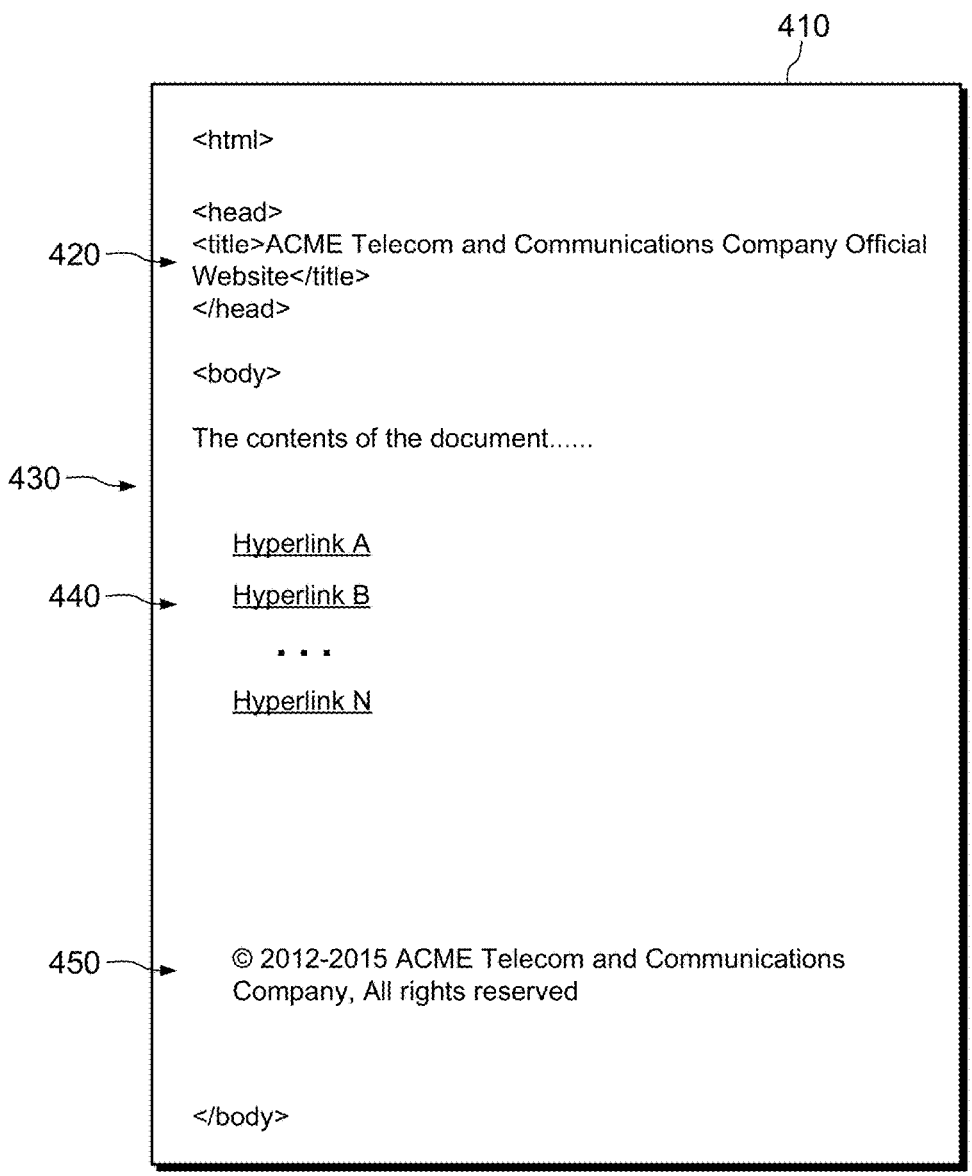
FIG. 4 is an illustration of an example web page downloaded by the entity discovery server.

FIG. 4 shows an example webpage 410 downloaded from the website at the URL 320. In this example, the content is seen to include HTML (HyperText Markup Language) code including paired tags and text within paired tags. For instance, the webpage 410 includes a title 420 within title tags (<title> and </title>) and body text 430 within body tags (<body> and </body>). The body text may include hyperlinks 440 specifying other URLs. The other URLs may point to other webpages on the same website and/or to webpages on other websites. The body text may also include a copyright notice 450. It should be understood that the hyperlinks 440 and/or copyright notice 450 may appear at locations on the webpage 410 besides between body tags, such as between header tags, footer tags, other tags, or no tags. The example shown is merely illustrative.

The entity discovery server 120 may perform various analysis tasks on the downloaded content to generate the entity-specific information 116a and the confidence score 116b. In a common example, the entity-specific information to be generated is simply the name of the entity. It may be desirable to produce the name of the entity if no name 114b is provided in the message 114, or if a name 114b is provided but there is a question as to its accuracy.

The entity discovery server 120 may employ various techniques to identify the name of the entity. These techniques may be used individually or in any combination and in any order. Once one technique has been tried, one or more other techniques may be used to provide confirmation.

Figure 5:
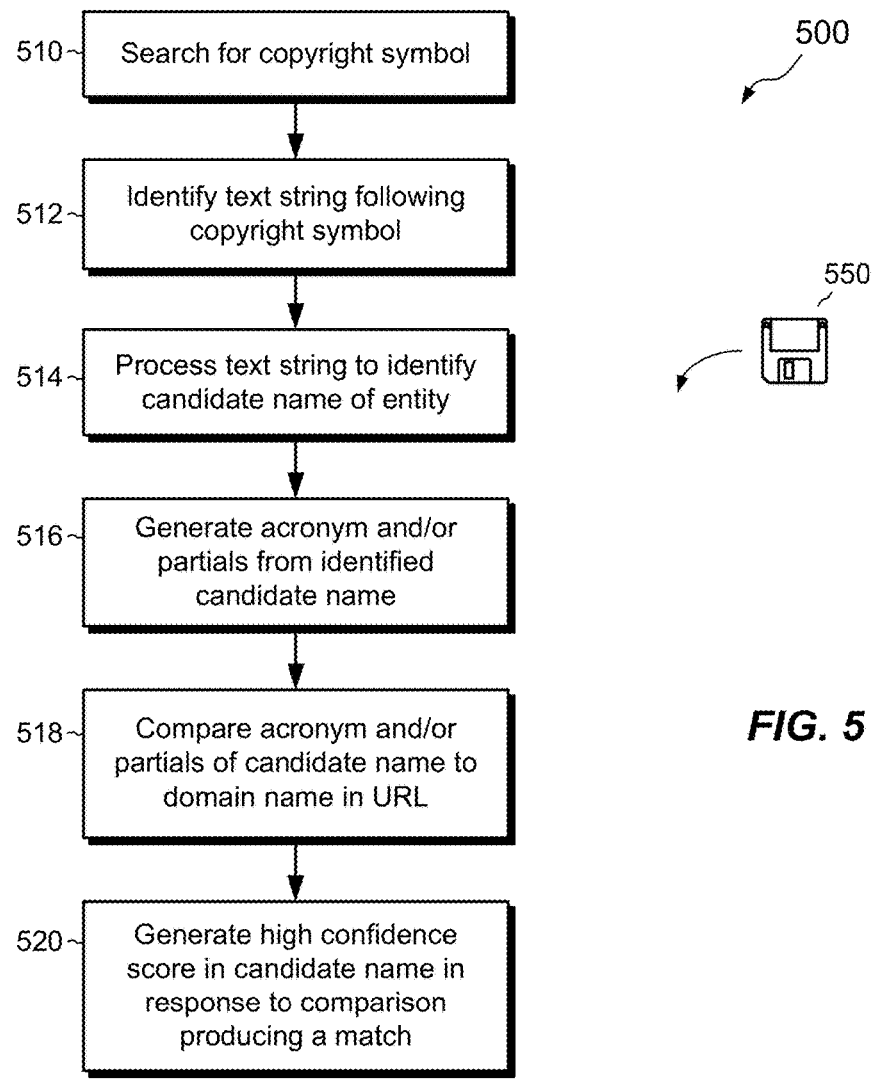
FIG. 5 is a flowchart showing an example process for identifying a candidate name of an entity from a copyright notice in a downloaded web page.

FIG. 5 shows an example process 500 for identifying the name of the entity. Here, the entity discovery server 120 operates to identify the name of the entity from the content downloaded from the website, e.g., from the webpage 410.

At 510, the executive 232 directs the text searcher/parser 234 to search the webpage 410 for a copyright symbol ("©").

At 512, the executive 232 directs the text searcher/parser 234 to identify text appearing in the webpage 410 that follows the copyright symbol. For example, the text searcher/parser 234 searches forward in the webpage 410 from the copyright symbol to the next tag, such as a <br> tag or some other tag or object, and returns the text between copyright symbol and the next object. In the example from FIG. 4, the text searcher/parser 234 may identify the text string following the copyright symbol as "2012-2015 ACME Telecom and Communications Company, All rights reserved."

At 514, the executive 232 directs processing to identify a candidate name of the entity within the text string. In one example, the executive 232 directs the text searcher/parser 234 to identify a substring of the text string. The substring omits any date or date range (e.g., "2012-2015;" see FIG. 4) from the text string and omits any standard statements, such as ", All rights reserved," which often accompany copyright notices. The executive 232 may then take the resulting substring as the candidate name. In another example, the executive 232 passes the text string to the NER engine 238. The NER engine 238 performs a statistical analysis on the text string and returns a substring that it classifies as a proper noun. The executive 232 may then take the output of the NER engine 238 as the candidate name.

With the candidate name thus identified, the executive 232 proceeds to compute a confidence score 114b. The confidence score 114b to be computed reflects a likelihood that the candidate name is the correct name of the entity.

At 516, the executive 232 directs the text searcher/parser 234 to generate an abbreviated name based on the candidate name. In an example, the abbreviated name includes, in order, the first letter of each word of the candidate name. Letters for common words, such as "and," "the" "for," and so on, may be excluded. For instance, the text searcher/parser 234 generates the acronym "ATCC" for "ACME Telecom and Communication Company." In some examples, multiple abbreviated names are generated, reflecting different words or parts of words of the candidate name. For example, the text searcher/parser 234 may also generate "ACTELCOMC" and "ATCOM."

At 518, the executive 232 compares the abbreviated names derived from the candidate name with the root of the domain name 312 (FIG. 3) found in the email address 114a, to determine whether there is a match.

At 520, the executive 232 generates the confidence score based on the degree of similarity between the abbreviated name or names and the root of the domain name 312. In an example, the executive 232 generates a high confidence score if an exact match is found and generates a lower confidence score if no exact match is found, with greater differences resulting in lower scores.

In some examples, the executive 232 may proceed with the entity name and confidence score computed above and may perform no additional acts to verify this information. For instance, the executive 232 compares the confidence score generated at step 520 with a predetermined threshold. If the confidence score exceeds the threshold, the executive 232 may perform no further acts to improve the confidence score. Rather, the executive 232 may send a response 116 including the candidate name and confidence score and/or may store the candidate name and the confidence score in the database 120a.

In other examples, the executive 232 performs one or more additional acts to verify the entity name. For instance, if the confidence score falls below the predetermined threshold, the executive 232 may proceed to perform the process 600 and/or 700.

Figure 6:
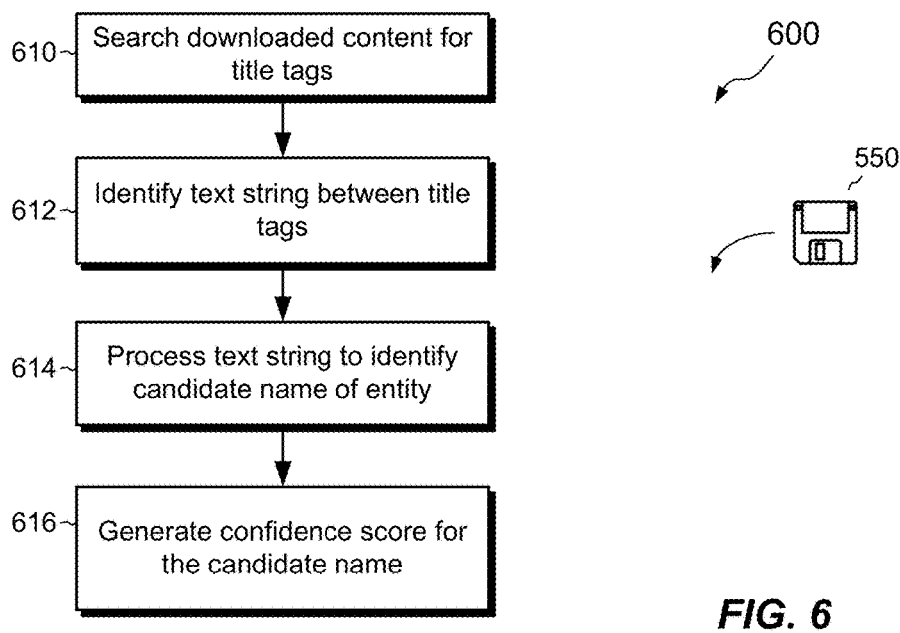
FIG. 6 is a flowchart showing an example process for identifying a candidate name of an entity using a title in a downloaded web page.

FIG. 6 shows an example process 600 for identifying the name of the entity. The process 600 may be conducted in place of the process 500 or in addition to the process 500, e.g., to verify results of the process 500.

At 610, the executive 232 directs the text searcher/parser 236 to search the downloaded content for title tags, such as those shown in FIG. 4. For example, the text searcher/parser 236 searches the web page 410 for the text "<title" and for the text "</title>." The text searcher/parser 236 then identifies a text string between the title tags (step 612). For example, referring back to FIG. 4, the text searcher/parser 236 may identify the text string as "ACME Telecom and Communications Company Official Website."

At 614, the executive 232 directs the text searcher/parser 236 to process the text string to identify a candidate name for the entity. This may include, for example, removing standard descriptive words or phrases from the text string, such as "website" or "official website," with the remaining text used to provide the candidate name. In some examples, the executive 232 provides the text string to the NER engine 238. The NER engine 238 processes the text string and returns a proper noun that provides the candidate name.

At 616, the executive 232 generates a confidence score. In an example, the executive 232 computes the confidence score by generating an abbreviated name (or multiple abbreviated names) and comparing the abbreviated names to the root of the domain name 312, in a manner similar to that described above in connection with the process 500.

If the entity discovery server 120 operates the process 600 to verify the results of the process 500, then the executive 232 may further act to compare the candidate entity name produced by the process 600 with the candidate entity name produced by the process 500. If the candidate names agree, the executive 232 may increase the confidence score; otherwise, the executive 232 may decrease the confidence score. The executive 232 may compare the updated confidence score with the threshold. If the confidence score exceeds the threshold, the executive may provide the entity name and updated confidence score in a response 116 and/or write them to the database 120a. Otherwise, the executive 232 may attempt further verification.

Figure 7:
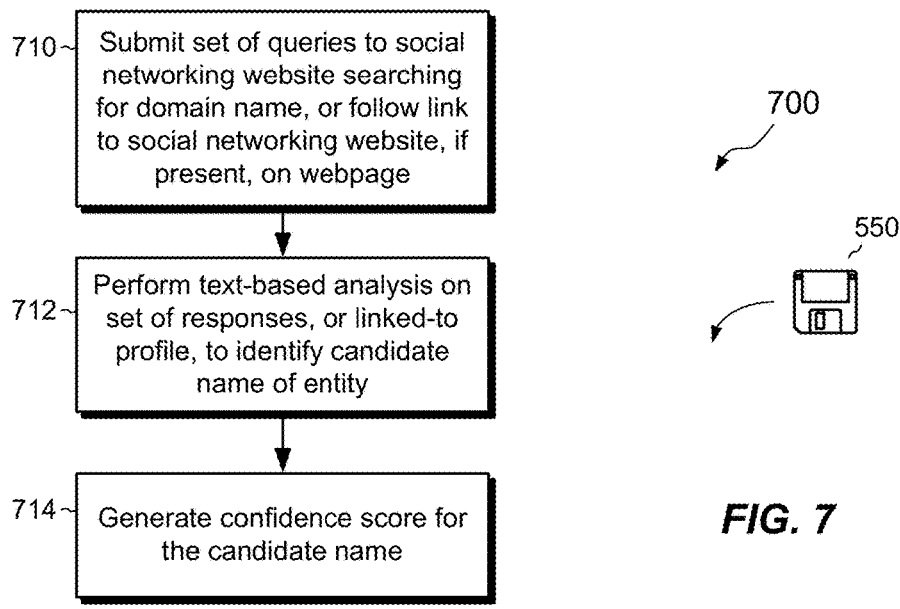
FIG. 7 is a flowchart showing an example process for identifying a candidate name of an entity using information acquired from a social networking website.

FIG. 7 shows yet another example process 700 for identifying the name of the entity. The process 700 may be conducted alone or in addition to the process 500 and/or the process 600. The process 700 involves obtaining and/or confirming the entity name based on information obtained from the social media website 140.

At 710, the executive 232 submits a set of queries to the social networking website 140, e.g., over the API 140a. One or more of the set of queries may specify the domain name 312 and/or a candidate name of the entity, e.g., one of the candidate names produced by the process 500 and/or the process 600. The set of queries return a set of responses from the social networking website 140. As an alternative to submitting queries over an API, the entity discovery server 120 may instead search for a link to a social media profile within the webpage 410 (or elsewhere on the same site). Many entities provide such links, e.g., with a message to the effect of "Follow us on Twitter at <link>." When any such link is present, the entity discovery server 120 may follow the link instead of, or in addition to, performing an independent search.

In some examples, the entity discovery server 120 accesses the social networking website 140 by logging on using the account of a user, such as the user 112 or the user 122. As is known, some social networking websites provide greater access to information when the information is requested by users who are logged in. In an example, the entity discovery server 120 obtains the user's account credentials in the message 114.

At 712, the executive 232 directs the text searcher/parser 234 to search through the set of responses to the queries, or to search through the linked-to profile, if a link was provided, to identify a candidate name. For example, the text searcher/parser 234 may perform screen scraping on pages downloaded from the social networking website 140 and/or may submit portions of downloaded text to the NER engine 238. Further, the text searcher/parser 234 may search for tags in the downloaded content and examine their values to identify candidate names. If the executive 232 is using the process 700 to confirm a candidate name already produced, the executive 232 may achieve this objective simply by finding the candidate name in the downloaded text.

In some examples, the process 700 applies machine learning techniques to produce a candidate name based on text downloaded from the social networking website 140. For example, a machine learning classifier, e.g., the statistical classifier 242, may be trained to identify entity names based on a corpus of text previously downloaded from entity pages of the social networking website 140. To generate the candidate name, the executive 232 applies the set of responses returned from the set of queries to the machine learning classifier and operates the classifier to generate an output, with the output then taken as the candidate name.

At 714, the executive 232 generates a confidence score. For example, the executive performs the already-described acts of constructing abbreviated names and testing for matches against the root of the domain name 312. Other heuristics may be employed, as well.

If the entity discovery server 120 operates the process 700 to confirm the results of the process 500 and/or the process 600, then the executive 232 may further act to compare the candidate entity name produced by the process 700 with the candidate entity name or names produced by the other processes. If the candidate names agree, the executive 232 may increase the confidence score; otherwise, the executive 232 may decrease the confidence score. If the updated confidence score still falls below the threshold, the executive 232 may perform yet another cross-checking process, or it may simply provide the entity name and the updated confidence score in a response 116 and/or write them to the database 120*a*, e.g., if no further progress can be made.

It should be understood that the entity discovery server 120 may perform any of the processes 500, 600, and/or 700, for identifying the entity name, and that the confidence score may be based not only on the individual processes, but also on the extent to which candidate names produced by the processes 500, 600, and 700 agree with one another.

It should be understood that techniques for validating candidate names are by no means limited to those described above. For instance, one additional technique involves searching for a telephone number on the webpage 410 (or anywhere on the same site) and then performing a reverse look-up on that number in an online phone directory. If the reverse look-up returns a name that matches the candidate name, then the name is further validated and the confidence score may be further increased.

Figure 8:
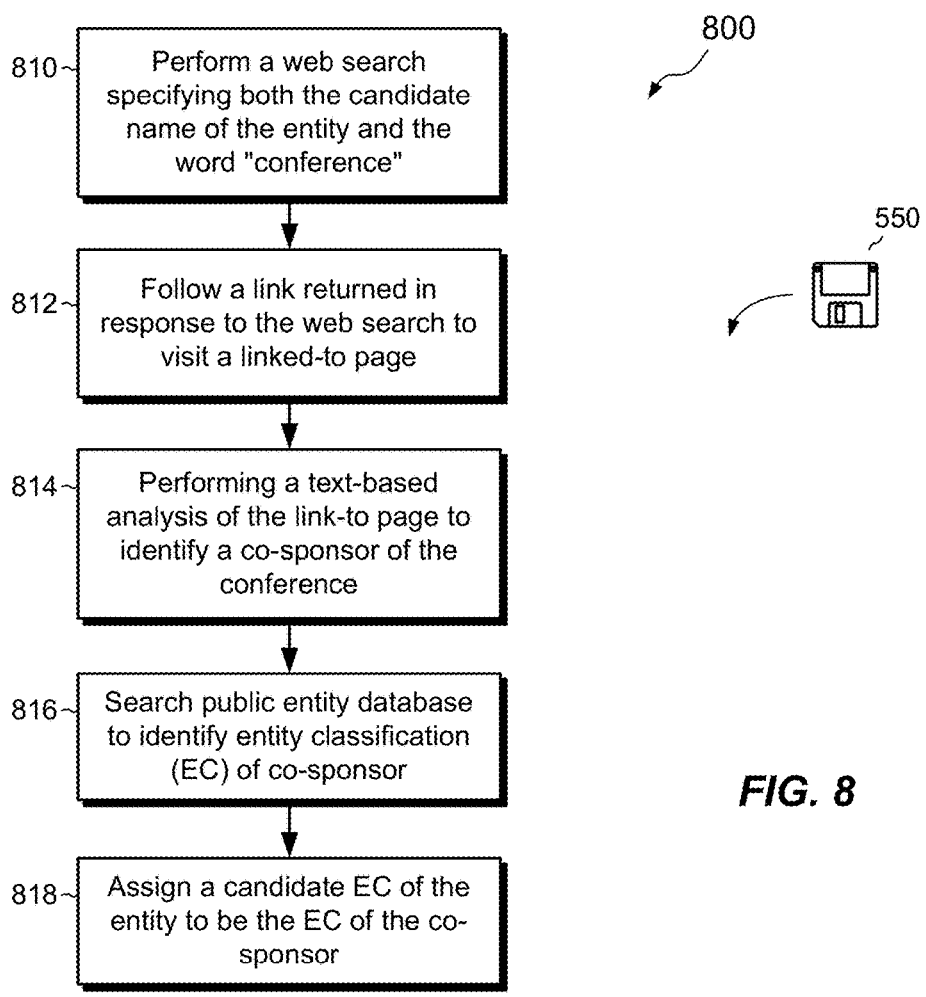
FIG. 8 is a flowchart showing one example process for identifying a candidate entity classification.

FIG. 8 shows an example process 800 for identifying an entity classification (EC) of the entity. The EC of an entity, sometimes referred to as its "vertical," provides a broad classification of the entity and describes the area in which the entity operates. Example ECs may include education, semiconductors, big data, automotive, and e-commerce, for example. Large entities, such as publicly traded corporations, have ECs that are listed in public databases, such as Edgar, Yahoo! Finance, etc. However, ECs of private companies and organizations are often unlisted and are therefore difficult or impossible to acquire by direct online searching. The process 800 provides a way to compute a candidate EC for an entity, which may be unlisted in any public database, based on the entity's association with another entity that is listed in a public database.

At 810, the entity discovery server 120 performs a web search, e.g., using Google Custom API, that requires both a candidate name for the entity and the word "conference." Other web searches may be carried out on the candidate name along with synonyms for the word "conference." The web search returns a list of links.

At 812, the entity discovery server 120 visits one or more pages linked-to in the search results.

At 814, the entity discovery server 120 performs a text-based analysis on linked-to page or pages, e.g., using any of the techniques described above, to identify another entity that co-sponsors the conference. For example, the links returned in response to the web search may include a link to a conference page, which describes the conference and lists the conference's sponsors. The entity discovery server 120 may follow multiple links before it finds a page that lists the conference sponsors. Once the entity discovery server 120 finds a page that lists the conference sponsors, the entity discovery server 120 identifies a co-sponsor of the conference from the page, e.g., by finding the name of a co-sponsor on the page in close proximity with the candidate name of the entity.

At 816, the entity discovery server 120 performs a search of the public entity database 150 (or of multiple such databases) to perform a look-up on the co-sponsor. If the public entity database 150 lists the co-sponsor, the executive 232 downloads record information from the public entity database 150 describing the co-sponsor. The executive 232 may direct the text searcher/parser 236 to identify an EC of the co-sponsor from the downloaded record information.

At 818, the entity discovery server 120 assigns a candidate EC of the entity to be the same as the EC of the co-sponsor obtained in step 816. Thus, the entity discovery server 120 uses the EC of the co-sponsor as a proxy for the EC of the entity. The entity discovery server 120 may generate a confidence score on the candidate EC, which may be based, for example, on corroborating information obtained from the web crawling operation, and may store the candidate EC and the confidence score in connection with the entity in the database 120*a*. Such information may also be sent to users in responses 116.

In some examples, the entity discovery server 120 performs a more fine-grained analysis to arrive at the candidate EC. For example, the entity discovery server 120 may search for multiple conferences and/or multiple co-sponsors, obtain ECs of such co-sponsors by performing database look-ups, and generate the candidate EC base on the database look-ups for multiple co-sponsors. In addition, the entity discovery server 120 may prioritize smaller conferences over larger ones in generating candidate ECs. The entity discovery server 120 may thus operate on the programmed assumption that smaller conferences tend to be more focused on an entity's core interests than are larger conferences, and thus that ECs of small conference co-sponsors are more likely to be closely aligned with one another than are the ECs of large conference co-sponsors.

In some examples, the entity discovery server 120 returns in the response 116 not only information about the entity, but also information about other entities, which the process 800 has identified as having the same or similar ECs. For example, the entity discovery server 120 may return a list of other entities found in the public entity database 150 that have the same EC as the co-sponsor.

Figure 9:
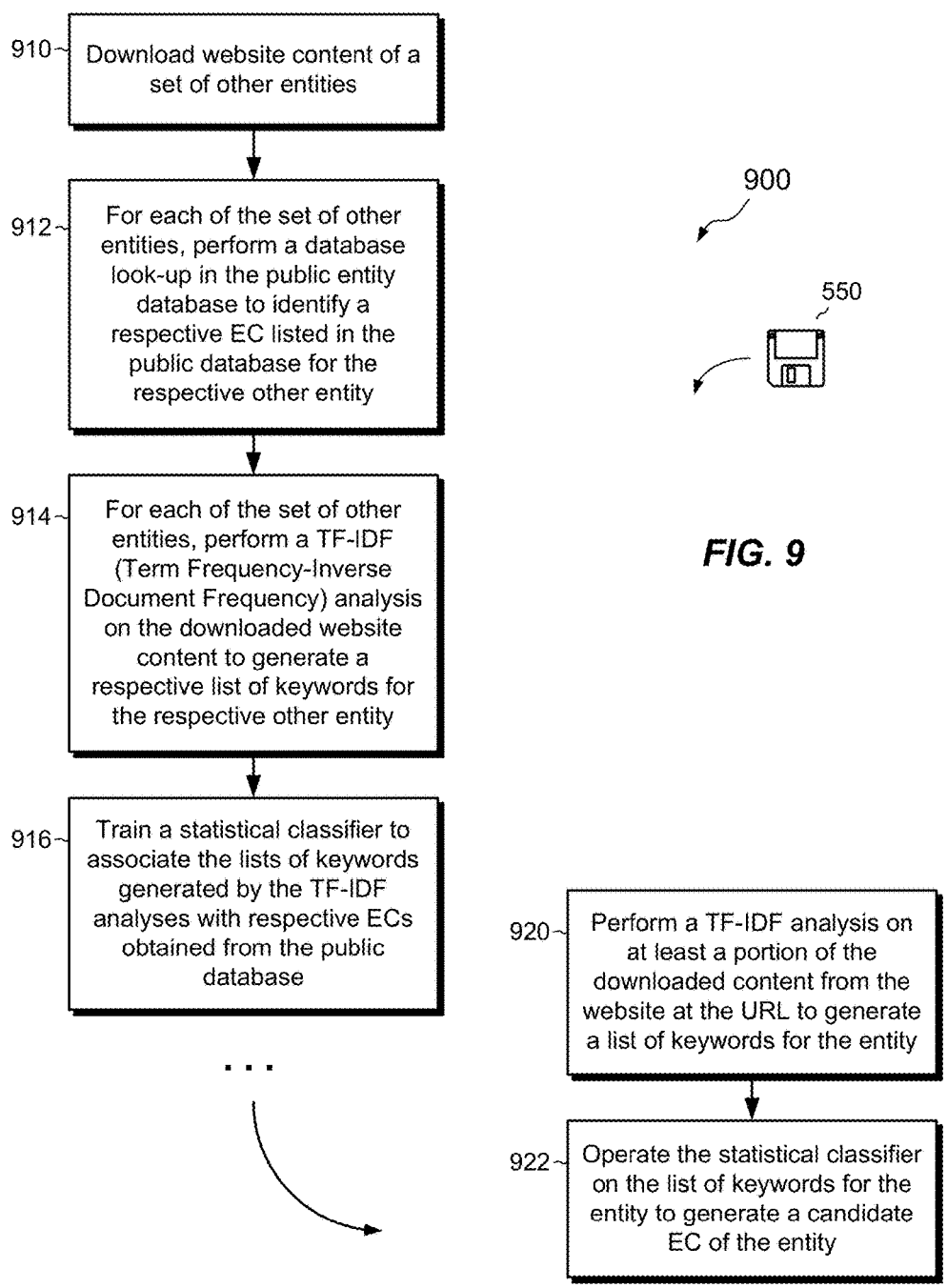
FIG. 9 is a flowchart showing another example process for identifying a candidate entity classification.

FIG. 9 shows an example process 900 for identifying an entity classification (EC) of the entity. The process 900 may be used in place of the process 800 or in addition thereto. In an example, the process 900 may be used to corroborate the results of the process 800, or vice-versa.

The process 900 has a first portion, including steps 910, 912, 914, and 916, which are directed to training a machine learning system to classify entities into different ECs. The process 900 also has a second portion, including steps 920 and 922, for operating the trained machine learning system to generate a candidate EC for the entity.

Starting at 910, the entity discovery server 120 downloads website content for a set of entities. The content may be acquired from the entity's website, social media page, and/or from other sources. Many diverse entities may be included. The website content may include descriptive information about what the entity does, such as content found in an "About Us" page or in a page with a similar title.

At 912, the entity discovery server 120 performs a look-up in the public entity database 150 (or in multiple such databases) for each of the set of entities to identify a respective EC for that entity listed in the public entity database 150.

At 914, the entity discovery server 120 performs a text-based analysis, such as a TF-IDF analysis, on the downloaded website content for each of the set of entities to generate a respective list of keywords for that entity. The keywords generated for each entity are preferably selected so as to be reasonably specific or unique to the subject matter described. For example, common words and terms may be filtered in favor of less common words and terms.

The order of steps 910, 912, and 914 can be varied. For instance, the process 900 might start instead by visiting the public entity database 150 and iterating through records. For each entity listed, the process 900 may record the EC of the entity and follow a link to the entity's website or social media page. Upon finding an "About Us" or similarly-entitled page or page content, the process 900 performs a text-based analysis to generate a list of keywords. The overall effect of steps 910, 912, and 914 is thus to generate a corpus of data on which to train a machine learning system to classify entities into respective ECs based on known ECs and website content.

At 916, with the corpus of data established, the process 900 trains the machine learning system on the corpus. Once trained, the machine learning system is able to receive a set of keywords and generate a candidate EC in response to that set of keywords. It should be understood that the process 900 may use any machine learning system capable of classifying keywords into categories. It is believed, however, that statistical classifiers excel at this task, and that naïve Bayes classifiers are particularly well-suited. Thus, in one example, the machine learning system is a naïve Bayes classifier.

At 920, with the machine learning system trained, the process 900 performs a text-based analysis, such as a TF-IDF analysis, on content from the entity's website or social media page, e.g., from an "About Us" page, in a manner similar to that performed at step 914 for each of the set of entities. The result of the text-based analysis is a list of keywords, which may be reasonably specific or unique to the activities of the entity.

At 922, the process 900 operates the machine learning system on the list of keywords for the entity to generate a candidate EC for the entity. Generation of the candidate EC thus benefits from the training performed on the corpus of data. In general, the greater the number of entities represented in the corpus, the better the quality of the candidate EC.

It should be understood that the quality of candidate ECs may be further improved by training the machine learning system on entities that operate in similar areas. Thus, for example, training the machine learning system on entities operating in the same sector of business or operation may yield better results than would training on companies in diverse sectors.

In an example, the entity discovery server 120 generates a confidence score for the candidate EC produced at step 922. The entity discovery server 120 may store both the candidate EC and the confidence score in the database 120a and may provide them in a response 116 to a user. In addition, when performing both processes 800 and 900, the entity discovery server 120 may compare the candidate ECs generated by the two processes. If they agree, the entity discovery server 120 may increase the confidence score. If they disagree, the entity discovery server 120 may decrease the confidence score.

In some examples, the entity discovery server 120 returns in the response 116 not only information about the entity, but also information about other entities, which the process 900 has identified as having the same or similar ECs. For example, the entity discovery server 120 may return a list of other entities from the set of entities on which the machine learning system was trained, which have the same or similar ECs.

Although certain processes described above have been directed at acquiring names of entities and ECs, it is understood that similar processes may be used for acquiring other types of information about entities, such as contact information, employee names, and employee titles.

When used as a tool for generating sales leads, the entity discovery server 120 may focus discovery tasks on entity blogs. For example, an entity blog on an entity's website or social media page may have many readers, such that an author of the blog may be an influential person whose opinions are widely shared. To this end, the entity discovery server 120 may employ the web crawler 234 to search for entity blogs and return names and email addresses of blog authors. In an example, such information is provided to users of the entity discovery server 120, to enable the users to target sales activities toward the blog author.

In a similar manner, the entity discovery server 120 may direct discovery activities toward identifying persons with internal influence within the entity. For instance, the entity discovery server 120 may employ the web crawler 234 to search the entity's website, social media pages, and/or elsewhere on the Internet for names and contact information of persons within the entity's organization who are responsible for internal purchasing decisions. The entity discovery server 120 may then provide the retrieved information about people with internal influence in responses 116 sent to users.

When identifying influential persons, the entity discovery server 120 may further assign confidence scores to any determinations it makes as to whether such persons are indeed influential. In an example, the entity discovery server 120 generates such confidence scores based on the popularity of the persons' names. For instance, the entity discovery server 120 may perform a web search requiring both a person's name and the entity name, with the number of search results indicating a level of popularity.

The entity discovery server 120 may further operate to discover the age of an entity. For instance, the entity discovery server 120 may search for an entity name in an Internet archive, such as WayBackMachine (archive.org/web). By limiting search queries to particular time frames, the entity discovery server 120 may zero in on a time of origination of an entity. The entity discovery server 120 may return results of such searches in entity-specific information 116a.

Figure 10:
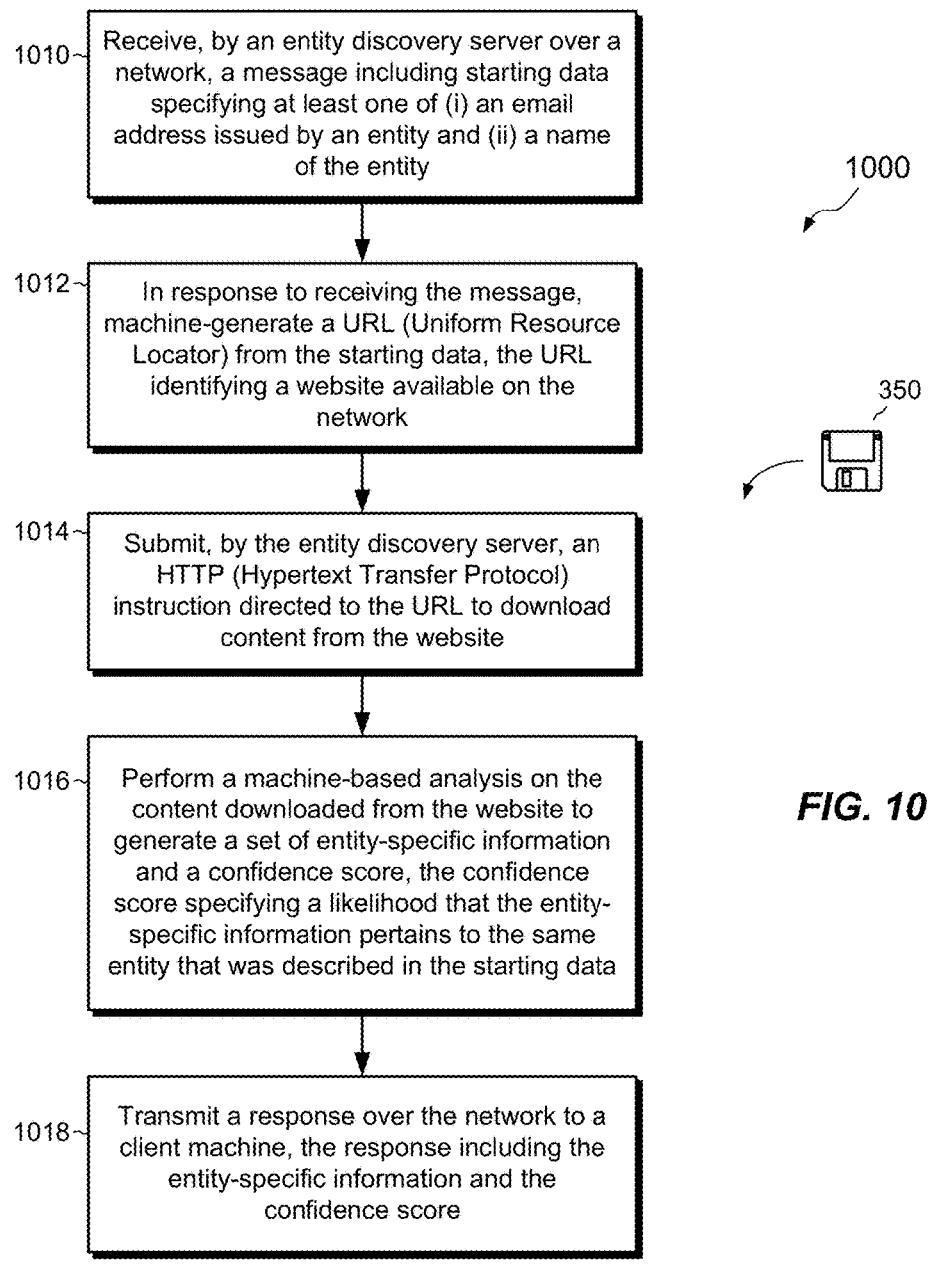
FIG. 10 is a flowchart showing an example process for providing information about entities to users.

FIG. 10 shows an example process 1000 for providing information about entities and serves as a summary of some of the operations described above. The process 1000 may be carried out, for example, by the entity discovery server 120, e.g., by the set of processors 220 executing instructions stored in the memory 230.

At 1010, the entity discovery server receives a message over a network. The message includes starting data specifying at least one of (i) an email address issued by the entity and (ii) a name of the entity. For example, as described in connection with FIG. 1, the entity discovery server 120 receives a message 114 over the network 130, including an email address 114a and an entity name 114b. In some cases, the message 114 arrives from the client machine 110 directly. In other cases, the message 114 arrives from the online system 180, e.g., after the online system 180 receives the email address and/or name of the entity from the client machine 110.

At 1012, a URL is machine generated in response to receiving the message. The URL identifies a website available on the network. For example, as described in connection with FIG. 3, the entity discovery server 120 machine-generates the URL 320 based on a domain name 312 included within the email address 114a received in the message 114. The URL provides a location of a website on the network 130, e.g., an official website of the entity.

At 1014, the entity discovery server submits an HTTP instruction directed to the URL to download content from the website. For example, as described in connection with FIGS. 3 and 4, the entity discovery server 120 sends an HTTP request or call to the website at the URL and receives, in response to the request or call, content from the website, e.g., in the form of web page 410.

At 1016, a machine-based analysis is performed on the content downloaded from the website to generate a set of entity-specific information and a confidence score. The confidence score specifies a likelihood that the entity-specific information pertains to the same entity that was described in the starting data. For example, as described in connection with FIG. 4, the entity discovery server 120 directs the text searcher/parser 236 and/or the NER engine 238 to identify an entity name 116a, e.g., by searching for a copyright notice, a title, and/or the social networking website 140. The entity discovery server 120 generates a confidence score 116b, which reflects a likelihood that the entity name is correct. The entity discovery server 120 may acquire additional information, such as the EC (Entity Classification) of the entity, contact information, information about employees, and so forth, and each element of information may have an associated confidence score.

At 1018, a response is transmitted over the network to a client machine. The response includes the entity-specific information and the confidence score (or scores). For example, as described in connection with FIG. 1, the entity discovery server 120 may send the response 116, including the entity-specific information 116a and the confidence score 116b, to the client machine 110 or 122.

An improved technique has been described for acquiring information about entities. Those skilled in the art will recognize that the improved technique hereof is more than the mere use of a computer to perform well-known methods for searching for information online. Rather, the improved technique involves particular acts of responding to a message including an email address and/or an entity name, submitting an HTTP instruction to download content from a website at a URL constructed from information contained in the message, and performing a machine-based analysis on the downloaded content to generate entity-specific information and a confidence score. Using the improved technique, persons are able to obtain information about entities, even small, private entities about which information online is sparse, along with a measure of quality of the information obtained.

Having described certain embodiments, numerous alternative embodiments or variations can be made. For example, although certain acts are described herein as being performed by the entity discovery server 120, any of these acts may be performed by other servers on the network 130 in communication with the entity discovery server 120. The entity discovery server 120 itself may be implemented as a single machine or as multiple machines.

Also, although activities have been described herein for accessing a social networking website 140, a public entity database 150, and so forth, it should be understood that such activities may access multiple websites and databases in generating entity-specific information and confidence scores.

Also, it has been described that the entity discovery server 120 performs a machine-based analysis directly on content downloaded from the website to generate the entity-specific information. This is merely an example, however. For instance, in one arrangement, the entity discovery server 120 renders the downloaded content as it would appear when displayed in a browser (e.g., using a browser or browser equivalent) and then obtains a screenshot or electronic printout (e.g., a PDF) of the downloaded content. If the entity discovery server 120 obtains a screenshot of the downloaded content, the entity discovery server 120 may further perform optical character recognition to convert graphical renderings of text into searchable text. The entity discovery server 120 may then apply the above-described text processing techniques to search for desired content, such as copyright notices, titles, addresses, phone numbers, and/or other desired information. This alternative arrangement may provide advantages for certain web content by excluding comments, java script, and other material that is normally invisible to users. In some examples, the entity discovery server 120 uses both directly downloaded content from a website and rendered content of the website (as it would visually appear to users), and computes correlations between the two versions to further improve confidence.

Also, it has been described that the entity discovery server 120 can compute a candidate EC (Entity Classification) based on an association between the entity and another entity having a known EC. It should be understood, however, that the generation of candidate ECs need not be limited to a single entity in question. For instance, the entity discovery server 120 may build a database that associates multiple entities with respective ECs. The database may be the same as the database 120a or may be different, and may include records listing any number of entities, which may be private and/or public. For example, when searching for co-sponsors of a conference, the entity discovery server 120 may identify multiple co-sponsors and may list each of them in a respective record of the database, all in connection with the same EC. The database may represent certain entities with multiple ECs, i.e., to reflect multiple areas of activity for the respective entities. Further, the entity discovery server 120 may identify ECs of entities in any suitable way and is not limited to doing so based on co-sponsorship of conferences. In a simple example, the entity discovery server 120 may obtain the EC of an entity (or of multiple entities) by querying a user or by analyzing the entity's website. The entity discovery server 120 may store ECs obtained through any such means in the database. Over time, the database may grow to include many entities, and may itself become a resource that the entity discovery server 120 may use to assist in identifying ECs of new entities. The database may thus come to reflect a complex network of ECs which allows entities to be associated based on EC even if the entities have no direct relationship via conferences or other events.

Also, the entity discovery server 120 may employ a variety of approaches to verify company names and/or other information. For example, the entity discovery server 120 may submit a candidate company name to an online patent and/or trademark database, such as the USPTO Patent Full-Text and Image Database, the USPTO Patent Application Full Text and Image Database, the Trademark Electronic Search System (TESS), and/or other online databases. If a search for a candidate name under the "applicant" or "assignee" field generates results, a confidence score in that candidate name may be increased. Otherwise, it may be decreased. In addition, searches of such databases may be used to establish or confirm ECs. For instance, if a patent search for a candidate entity name returns results in a particular patent classification, the entity discovery server 120 may apply that patent classification to identify an EC.

It has been described that the entity discovery server 120 may generate the EC of an entity based on the EC of another entity that co-sponsors a conference. It should be understood, however, that the conference need not be an in-person conference. For instance, the conference may be an electronic conference, such as a web conference, webinar, web-based training event, web-based teaching event, etc., which is conducted by the online system 180. For example, the online system 180 includes an electronic conferencing server for facilitating electronic conferences. Here, the online system 180 may already be in possession of the name of the entity and the name of the co-sponsor, and may feed this information to the entity discovery server 120. The entity discovery server 120 in turn may perform the processes 800 and/or 900, or portions thereof, to generate a candidate EC for the entity with knowledge of this conference co-sponsorship already in place.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a computer program product including one or more non-transient, computer-readable storage media, such as a magnetic disk, magnetic tape, compact disk, DVD, optical disk, flash drive, SD (Secure Digital) chip or device, Application Specific Integrated Circuit (ASIC), Field Programmable Gate Array (FPGA), and/or the like (shown by way of example as medium 550 in FIGS. 5-10). Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A computer-implemented method of providing information about entities, the method comprising:

receiving, by an entity discovery server over a network, a message including starting data specifying at least one of (i) an email address issued by an entity and (ii) a name of the entity;

in response to receiving the message, machine-generating a URL (Uniform Resource Locator) from the starting data, the URL identifying a website available on the network;

submitting, by the entity discovery server, an HTTP (Hypertext Transfer Protocol) instruction directed to the URL to download content from the website;

performing a machine-based analysis on the content downloaded from the website to generate a set of entity-specific information and a confidence score, the confidence score specifying a likelihood that the entity-specific information pertains to the same entity that was described in the starting data; and transmitting a response over the network to a client machine, the response including the entity-specific information and the confidence score, wherein the method further comprises:

downloading website content of a set of other entities each having a website accessible over the network;

for each of the set of other entities, (i) performing a database look-up in the public entity database to identify a respective EC (Entity Classification) listed in the public database for the respective other entity and (ii) performing a TF-IDF (Term Frequency-Inverse Document Frequency) analysis on the downloaded website content to generate a respective list of keywords for the respective other entity;

training a statistical classifier to associate the lists of keywords generated by the TF-IDF analyses with respective ECs obtained from the public entity database;

performing a TF-IDF analysis on at least a portion of the downloaded content from the website at the URL to generate a list of keywords for the entity; and operating the statistical classifier on the list of keywords for the entity to generate a candidate EC of the entity, wherein transmitting the response to the client machine includes providing the candidate EC to the client machine.

2. The method of claim 1, wherein the starting data includes the email address issued by the entity, and wherein performing the machine-based analysis includes:

performing a text searching operation on the downloaded content or a visually-rendered version thereof to locate a copyright symbol;

identifying a string of text in the downloaded content immediately following the copyright symbol; and processing the string of text to identify a candidate name of the entity, wherein returning the response includes returning the candidate name.

3. The method of claim 2, wherein the email address issued by the entity includes a domain name having a root and an extension, and wherein, to generate the confidence score, the method further comprises:

concatenating portions of a set of words of the candidate name to produce an abbreviated name;

comparing the abbreviated name with the root of the domain name; and setting the confidence score to a high value in response to the root of the domain name including the abbreviated name.

4. The method of claim 2, wherein performing the machine-based analysis further includes:
   searching the downloaded content to find an HTML title tag, the HTML title tag specifying a title of a web page;
   processing the title of the web page to identify a second candidate name of the entity; and
   increasing the confidence score in response to the second candidate name matching the candidate name.

5. The method of claim 2, wherein the email address issued by the entity includes a domain name, and wherein the method further comprises:
   submitting a set of queries to a social networking website over an API (Application Programmer Interface) provided by the social networking website, the set of queries searching the social networking website for the domain name;
   receiving, in response to the set of queries, a set of responses;
   performing a text-based analysis of each of the set of responses to identify a third candidate name from the set of responses; and
   increasing the confidence score in response to the third candidate name matching the candidate name.

6. The method of claim 5, wherein the email address has been issued by the entity to a user, wherein the user has an account on the social networking website, and wherein, when submitting the set of queries to the social networking website, the method includes logging on to the social networking website with credentials of the user.

7. The method of claim 2, wherein, to generate the confidence score, the method further comprises performing a sequence of name verification operations, the sequence of name verification operations constructed and arranged to perform the following operations in any order:
   (a) cross-checking the candidate name against a title provided in an HTML title tag in the downloaded content; and
   (b) cross-checking the candidate name against responses to queries submitted to a social networking website,
   wherein, when performing the sequence of name verification operations, the method further comprises increasing the confidence score in response to each name-verification operation that confirms the candidate name.

8. The method of claim 2, wherein processing the string of text to identify the candidate name of the entity includes submitting the string of text to a named-entity recognition (NER) engine and receiving the candidate name of the entity in response to submitting the string of text.

9. The method of claim 8, wherein performing the machine-based analysis further includes:
   performing a web search requiring both the candidate name of the entity and the word "conference" or a synonym thereof;
   following a link returned in response to the web search to visit a linked-to page;
   performing a text-based analysis of the link-to page to identify a co-sponsor of the conference;
   searching a public entity database accessible over the network to identify an EC listed in the public entity database for the co-sponsor; and
   assigning a second candidate EC of the entity to the EC listed in the public entity database for the co-sponsor.

10. The method of claim 9, further comprising:
    generating a high confidence score for the EC in response to the candidate EC of the entity matching the second candidate EC;
    wherein transmitting the response to the client machine includes sending the second candidate EC of the entity to the client machine, along with the high confidence score for the EC.

11. The method of claim 10, wherein the statistical classifier is a naïve Bayes classifier.

12. The method of claim 10, wherein, when transmitting the response to the client machine, the method further comprises providing a list of other entities that have ECs that match the second candidate EC.

13. A computerized server apparatus comprising a controller including a set of processors coupled to memory, the controller constructed and arranged to:
    receive, by an entity discovery server over a network, a message including starting data specifying at least one of (i) an email address issued by an entity and (ii) a name of the entity;
    in response to receiving the message, machine-generate a URL (Uniform Resource Locator) from the starting data, the URL identifying a website available on the network;
    submit, by the entity discovery server, an HTTP (Hypertext Transfer Protocol) instruction directed to the URL to download content from the website;
    perform a machine-based analysis on the content downloaded from the website to generate a set of entity-specific information and a confidence score, the confidence score specifying a likelihood that the entity-specific information pertains to the same entity that was described in the starting data; and
    transmit a response over the network to a client machine, the response including the entity-specific information and the confidence score,
    wherein the controller is further constructed and arranged to:
       download website content from a set of other entities each having a website accessible over the network;
       for each of the set of other entities, (i) perform a database look-up in a public entity database to identify a respective EC (Entity Classification) listed in the public database for the respective other entity and (ii) perform a TF-IDF (Term Frequency-Inverse Document Frequency) analysis on the downloaded website content to generate a respective list of keywords for the respective other entity;
       train a statistical classifier to associate the lists of keywords generated by the TF-IDF analyses with respective ECs obtained from the public database;
       perform a TF-IDF analysis on at least a portion of the downloaded content from the website at the URL to generate a list of keywords for the entity; and
       operate the statistical classifier on the list of keywords for the entity to generate a candidate EC of the entity; and
    wherein transmitting the response to the client machine includes providing the candidate EC to the client machine.

14. The computerized server apparatus of claim 13, wherein, when constructed and arranged to perform the machine-based analysis, the controller is further constructed and arranged to perform a text processing operation on at least a portion of the downloaded content to identify a conference sponsored by the entity, and wherein the controller is further constructed and arranged to:
    perform a web crawling operation to follow a set of hyperlinks in the downloaded content;

identify, from results of the web crawling operation, another entity that co-sponsors the conference;
search a public entity database accessible over the network to identify an EC listed in the public entity database for the other entity; and
assign a second candidate EC of the entity to the EC listed in the public entity database for the other entity.

15. The computerized server apparatus of claim 13, wherein, when constructed and arranged to transmit the response to the client machine, the controller is further constructed and arranged to provide a list of other entities have ECs that match the second candidate EC.

16. A computer program product including a set of non-transitory, computer-readable media having instructions which, when executed by a controller of a computerized server apparatus, cause the controller to perform a method of providing information about entities, the method comprising:
receiving, by an entity discovery server over a network, a message including starting data specifying at least one of (i) an email address issued by an entity and (ii) a name of the entity;
in response to receiving the message, machine-generating a URL (Uniform Resource Locator) from the starting data, the URL identifying a website available on the network;
submitting, by the entity discovery server, an HTTP (Hypertext Transfer Protocol) instruction directed to the URL to download content from the website;
performing a machine-based analysis on the content downloaded from the website to generate a set of entity-specific information and a confidence score, the confidence score specifying a likelihood that the entity-specific information pertains to the same entity that was described in the starting data; and
transmitting a response over the network to a client machine, the response including the entity-specific information and the confidence score,
wherein the method further comprises:
downloading website content of a set of other entities each having a website accessible over the network;
for each of the set of other entities, (i) performing a database look-up in the public entity database to identify a respective EC (Entity Classification) listed in the public database for the respective other entity and (ii) performing a TF-IDF (Term Frequency-Inverse Document Frequency) analysis on the downloaded website content to generate a respective list of keywords for the respective other entity;
training a statistical classifier to associate the lists of keywords generated by the TF-IDF analyses with respective ECs obtained from the public entity database;
performing a TF-IDF analysis on at least a portion of the downloaded content from the website at the URL to generate a list of keywords for the entity; and
operating the statistical classifier on the list of keywords for the entity to generate a candidate EC of the entity,
wherein transmitting the response to the client machine includes providing the candidate EC to the client machine.

17. The computer program product of claim 16, wherein the starting data includes the email address issued by the entity, and wherein performing the machine-based analysis includes:
identifying a first candidate name of the entity as a name provided in connection with a copyright notice located in the downloaded content;
identifying a second candidate name of the entity as a name provided in an HTML title tag located in the downloaded content;
identifying a third candidate name of the entity obtained by visiting a social networking linked-to in the downloaded content; and
computing the confidence score based at least in part on a degree to which the first, second, and third candidate names agree with one another.

18. The computer program product of claim 17, wherein the request is received from an electronic conferencing server that conducts an online webinar, in response to a participant of the on-line webinar providing the participant's own email address to participate in the on-line webinar.

19. The computer program product of claim 16, wherein the starting data includes the name of the entity, and wherein the method further comprises:
performing a web search for the entity name;
following a link returned by the web search to a linked-to page;
extracting a candidate entity name from the linked-to page;
comparing the candidate entity name with a list of names provided on a known-entities list; and
in response to the candidate entity name matching one of the names provided on the known-entities list, generating a result indicating that the linked-to page is a website of the entity.

* * * * *